(12) United States Patent
Tang (10) Patent No.: US 10,906,589 B2
(45) Date of Patent: Feb. 2, 2021

(54) FLEXIBLE BASE AND SELF-DRIVEN ROBOT

(71) Applicant: BEIJING GEEKPLUS TECHNOLOGY CO., LTD., Beijing (CN)

(72) Inventor: Yan Tang, Beijing (CN)

(73) Assignee: Beijing Geekplus Technology Co., Ltd., Beijing (CN)

(*) Notice: Subject to any disclaimer, the term of this patent is extended or adjusted under 35 U.S.C. 154(b) by 0 days.

(21) Appl. No.: 16/472,836

(22) PCT Filed: Jul. 12, 2018

(86) PCT No.: PCT/CN2018/095447
§ 371 (c)(1),
(2) Date: Jun. 21, 2019

(87) PCT Pub. No.: WO2019/114266
PCT Pub. Date: Jun. 20, 2019

(65) Prior Publication Data
US 2019/0329826 A1    Oct. 31, 2019

(30) Foreign Application Priority Data

Dec. 13, 2017   (CN) .......................... 2017 1 1328398

(51) Int. Cl.
*B62D 24/04*   (2006.01)
*B25J 5/00*    (2006.01)
(Continued)

(52) U.S. Cl.
CPC .............. *B62D 24/04* (2013.01); *B25J 5/007* (2013.01); *B62D 21/02* (2013.01); *G05D 1/021* (2013.01); *B60P 1/48* (2013.01)

(58) Field of Classification Search
CPC ...... B62D 24/04; B62D 21/02; B62D 21/186; B62D 61/04; B62D 21/18; B62D 37/00;
(Continued)

(56) References Cited

U.S. PATENT DOCUMENTS 5,549,175 A * 8/1996 Torii ..................... B60G 3/00
                                             180/209
7,174,976 B2 * 2/2007 Kamen ................. A63C 17/01
                                             180/19.1
(Continued)

FOREIGN PATENT DOCUMENTS

CN    101016062 A    8/2007
CN    103287523 A    9/2013
(Continued)

OTHER PUBLICATIONS

International Search Report and Written Opinion dated Oct. 11, 2018, regarding PCT/CN2018/095447.
(Continued)

*Primary Examiner* — James A English
(74) *Attorney, Agent, or Firm* — Arent Fox LLP (57) ABSTRACT

Provided are an adjusting base and a self-driven robot. The flexible base includes: a chassis, a carrying plate and an adjusting mechanism. The bottom of the chassis is provided with at least one second driven wheel and at least two driving wheels. The bottom of the carrying plate is provided with at least a first driven wheel. The adjusting mechanism is configured to connect to the carrying plate and the chassis or connect to the carrying plate and the second driven wheel. When the ground is uneven, the adjusting mechanism is configured to dynamically adjust the second driven wheel in such a manner that the first driven wheel, the second driven wheel and the driving wheels are in contact with the ground.

18 Claims, 10 Drawing Sheets

(51) Int. Cl.
*B62D 21/02* (2006.01)
*G05D 1/02* (2020.01)
*B60P 1/48* (2006.01)

(58) Field of Classification Search
CPC .......... B25J 5/007; B25J 19/00; B25J 11/008; B60P 1/48
See application file for complete search history.

(56) References Cited

U.S. PATENT DOCUMENTS

| | | | |
|---|---|---|---|
| 9,457,970 | B1 | 10/2016 | Zevenbergen et al. |
| 2013/0020775 | A1* | 1/2013 | Beji .................... B62D 21/186 280/43 |
| 2018/0072355 | A1* | 3/2018 | Sakashita ............. B62D 21/186 |
| 2019/0009854 | A1* | 1/2019 | Bao ............................ B62J 1/00 |
| 2020/0079171 | A1* | 3/2020 | Liu ........................ B60G 21/05 |

FOREIGN PATENT DOCUMENTS

| | | | |
|---|---|---|---|
| CN | 204978945 U | | 1/2016 |
| CN | 106739917 A | | 5/2017 |
| CN | 107139670 A | * | 9/2017 |
| CN | 107416071 A | * | 12/2017 |
| CN | 107416071 A | | 12/2017 |
| CN | 108000478 A | | 5/2018 |
| CN | 108263509 A | | 7/2018 |
| EP | 3281848 A | | 2/2018 |
| EP | 3556581 A1 | | 10/2019 |
| JP | H07-81639 A | | 3/1995 |
| JP | H08-258763 A | | 10/1996 |
| JP | 2005313720 A | * | 11/2005 |
| JP | 20100095143 A | | 4/2010 |
| WO | 2016152966 A1 | | 9/2016 |

OTHER PUBLICATIONS

Extended European Search Report corresponding to EP Patent Application No. 18882286.0-1016 dated Jul. 7, 2020.

* cited by examiner

FLEXIBLE BASE AND SELF-DRIVEN ROBOT

CROSS REFERENCE TO RELATED APPLICATIONS

This is a U.S. National Stage Application, filed under 35 U.S.C. 371, of International Patent Application No. PCT/CN2018/095447, filed on Jul. 12, 2018, which claims priority to Chinese Patent Application No. 201711328398.1 filed on Dec. 13, 2017, the disclosures of which are incorporated herein by reference in their entirety.

TECHNICAL FIELD

The present disclosure relates to the field of goods sorting, for example, to a flexible base and a self-driven robot.

BACKGROUND

Conventionally, the entry and delivery of goods in a warehouse are usually carried out by warehouse employees who place goods on the corresponding shelves and corresponding positions in turn with forklifts or carts. This process is time-consuming and costly in labor, and when the goods in the warehouse are of various types, the operation process is complicated and error-prone.

At present, with the attempt of warehouse automation, the warehouse self-driven robot is used to carry the goods during the entry and delivery. The robot enters the storage area, finds the target shelf and sends the goods to the workstation to achieve the delivery and entry of the goods.

For the warehouse self-driven robot, a self-driven robot with more than 3 wheels will be over-defined. If the ground is uneven or the wheels are not mounted at an exact same height, some of the wheels may loss contact with the ground and lose the traction. If the wheel which loses the traction is a driving wheel of the self-driven robot, the self-driven robot would be out of control.

SUMMARY

In view of this, the present application provides a flexible base and a self-driven robot that enable wheels to be in better contact with the ground through an adjusting mechanism disposed between the chassis and the carrying plate.

The present application provides a flexible base, which is applied to a self-driven robot. The flexible base includes: a chassis, a carrying plate and an adjusting mechanism. The bottom of the chassis is provided with at least one second driven wheel and at least two driving wheels, and a disposing position of the second driven wheel does not coincide with disposing positions of the driving wheels. The bottom of the carrying plate is provided with at least a first driven wheel, and a disposing position of the first driven wheel does not coincide with disposing positions of the second driven and the driving wheels. The adjusting mechanism is configured to be connected to the carrying plate and the chassis or configured to be connected to the carrying plate and the second driven wheel. When the ground is uneven, the adjusting mechanism is configured to dynamically adjust the second driven wheel in such a manner that the first driven wheel, the second driven wheel and the driving wheels are in contact with the ground.

The present application provides a self-driven robot. The self-driven robot includes a flexible base, at least two drive motors, and a lifting mechanism. The flexible base includes: a chassis, a carrying plate, and an adjusting mechanism.

A bottom of the chassis is provided with at least one second driven wheel and at least two driving wheels, and a disposing position of the second driven wheel does not coincide with disposing positions of the driving wheels. A bottom of the carrying plate is provided with at least a first driven wheel, and a disposing position of the first driven wheel does not coincide with disposing positions of the second driven and the driving wheels. The adjusting mechanism is configured to be connected to the carrying plate and the chassis or configured to be connected to the carrying plate and the second driven wheel. When the ground is uneven, the adjusting mechanism is configured to dynamically adjust the second driven wheel in such a manner that the first driven wheel, the second driven wheel and the driving wheels are in contact with the ground. The at least two drive motors are disposed above the flexible base and respectively connected to at least two driving wheel The flexible base and the self-driven robot of the present application may ensure that the wheels are in contact with the ground and improve the walking stability of the self-driven robot.

DETAILED DESCRIPTION

Unless otherwise defined, the technical terms or scientific terms used herein shall have a general meaning understood by those with general skills in the field to which the present application belongs. The term "first", "second" and the like in the present application are used to distinguish different components but not used to describe any order, quantity or significance. Similarly, the term "one", "a/an", "the" or the like does not mean a quantitative limit, but indicates at least one. The term "including", "comprising" or the like means that the elements or objects in front of the term cover elements or objects and their equivalents listed in after the term, but does not exclude other elements or objects. The term "couple", "connect" or the like are not limited to physical or mechanical connections, but may include electrical connections, whether it is direct or indirect. "On", "below", "left", "right" and the like are merely utilized to indicate the relative positional relationship, and when the absolute position of the described object is changed, the relative positional relationship may also change accordingly.

Figure 1A:
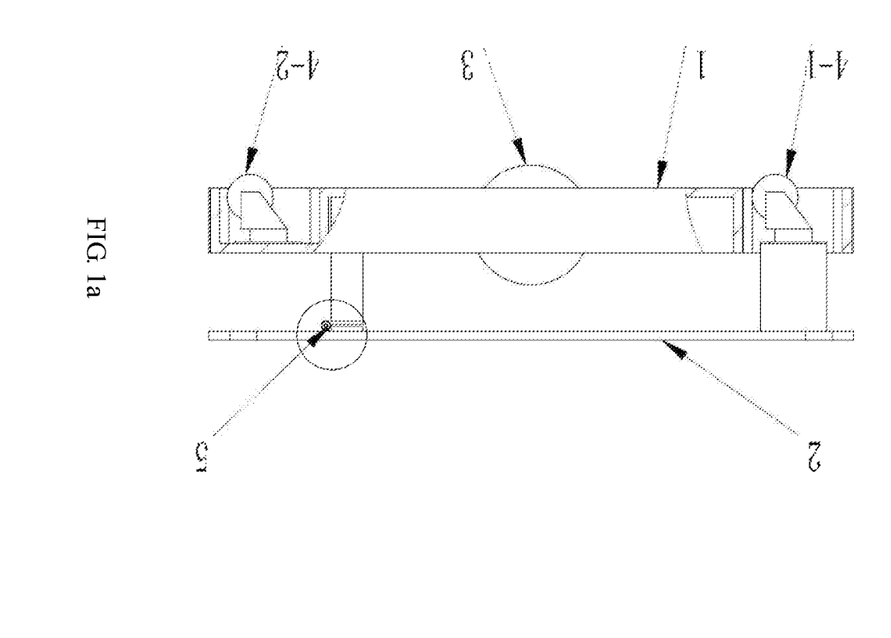
FIGS. 1a-1c are schematic diagrams of a flexible base according to an embodiment of the present application.
Figure 1B:
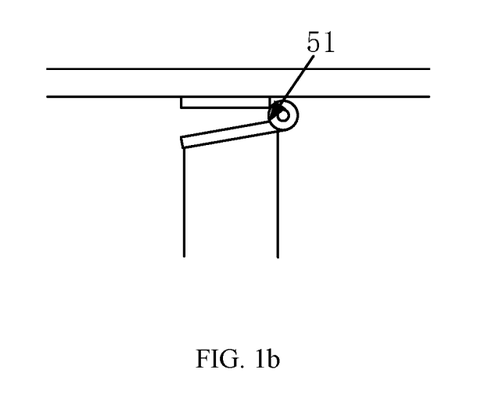
Figure 1C:
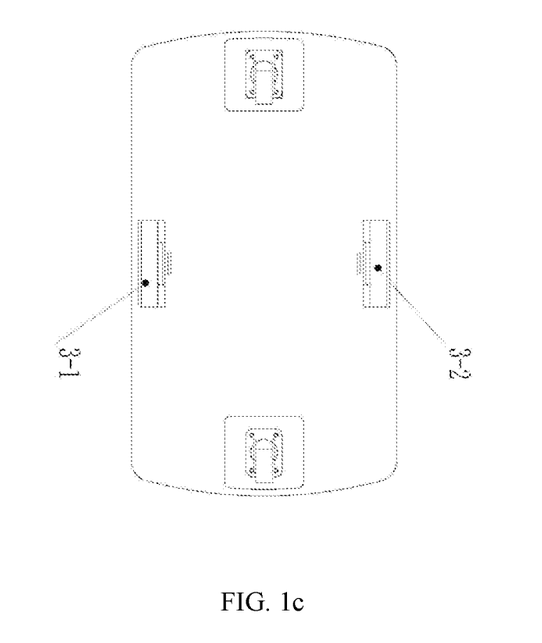

One aspect of the present application provides a flexible base. With reference to FIGS. 1a-1c, the flexible base includes: a chassis 1, a carrying plate 2 and an adjusting mechanism 5. The bottom of the chassis 1 is provided with at least one second driven wheel 4-2 and at least two driving wheels 3 (3-1 and 3-2), and a disposing position of the second driven wheel 4-2 does not coincide with disposing positions of the driving wheels 3. The bottom of the carrying plate 2 is provided with at least one first driven wheel 4-1, and a disposing position of the first driven wheel 4-1 does not coincide with disposing positions of the second driven wheel 4-2 and the driving wheels 3. The adjusting mechanism 5 is configured to connect the carrying plate 2 and the chassis 1, and when the ground is uneven, the adjusting mechanism 5 is configured to dynamically adjust the second driven wheel 4-2 in such a manner that the first driven wheel 4-1, the second driven wheel 4-2 and the driving wheels 3 are in contact with the ground. According to the flexible base of the present application, the carrying plate 2 and the chassis 1 are connected through the adjusting mechanism 5, to the driven wheels and the driving wheels are in better contact with the ground, thereby improving the moving stability.

In one embodiment, for example, the second driven wheel 4-2 and the two driving wheels 3-1 and 3-2 on the chassis 1 are always in contact with the ground, i.e., the three wheels form a plane. Meanwhile, if the chassis 1 has four wheels (for example, two driven wheels and two driving wheels) and the ground on which the self-driven robot is traveling is uneven, it is likely that one of the wheels loses contact with the ground, which greatly affects the moving stability of the self-driven robot. In view of this, in the present application, a driven wheel is connected to the chassis 1 through the carrying plate 2, so that, for example, when the second driven wheel 4-2 is subjected to a force, the carrying plate 2 can dynamically adjust a distance between the second driven wheel 4-2 and the chassis 1, thereby ensuring that the four wheels are in contact with the ground.

With reference to FIG. 1b, in one embodiment, a first end of the adjusting mechanism 5 is hinged to the chassis 1, and a second end of the adjusting mechanism 5 is connected to the carrying plate 2. For example, the first end of the adjusting mechanism 5 can be connected to the chassis 1 through a hinge structure 51, so that the adjusting mechanism 5 can rotate relative to the chassis 1, such that the driven wheels are adjusted when the ground surface changes. For example, as shown in FIG. 1b, in order to enable the adjusting mechanism 5 to rotate in a left direction and a right direction (viewed facing the drawing), the hinge structure 51 includes a notch on a left side in the drawing, so that the carrying plate 2 can rotate to the left side in the drawing and can also freely rotate to the right side.

Figure 2A:
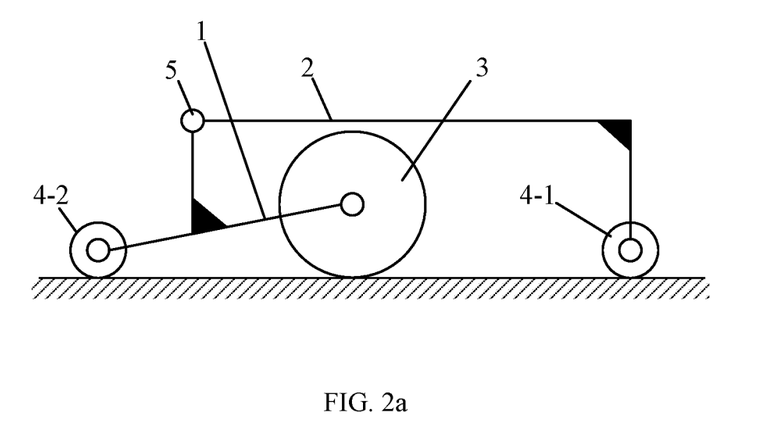
FIG. 2a is a schematic diagram of a force acted by the flexible base on a flat ground according to an embodiment of the present application.

With reference to FIG. 2a, when the carrying plate 2 is subjected to a force from the second driven wheel 4-2, the attitude of the carrying plate 2 relative to the chassis 1 can be adaptively adjusted, so that the driven wheel and the driving wheel are always in contact with the ground. Similarly, the second end, which is closer to the carrying plate 2, of the adjusting mechanism 5 is fixedly connected or hinged to the carrying plate 2. That is, the adjusting mechanism 5 may be hinged to the carrying plate 2 or may be fixedly connected to the carrying plate 2. For example, when two ends of the adjusting mechanism 5 are hinged to the chassis 1 and the carrying plate 2 respectively, the degree of freedom of the adjusting mechanism can be improved and the adjusting mechanism can dynamically adjust the driven wheels with an improved flexibility.

Figure 2B:
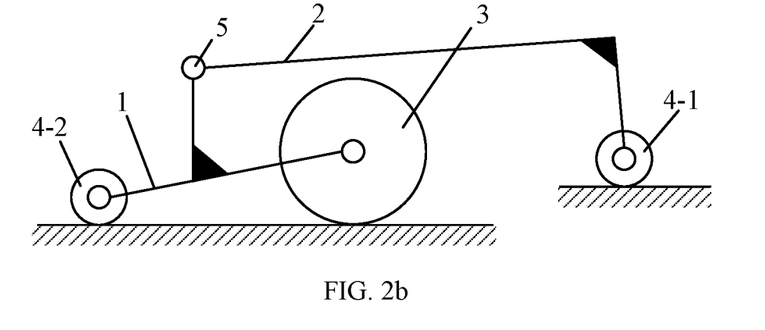
FIG. 2b is a schematic diagram illustrating that a flexible base adjusts driven wheels when being on an uneven ground according to an embodiment of the present application.

With reference to FIG. 2a and FIG. 2b, when the ground is uneven, the chassis 1 and the carrying plate 2 automatically adapt to the unevenness of the ground surface through, for example, the adjusting mechanism 5, thereby ensuring that all the wheels are in contact with the ground.

Figure 5A:
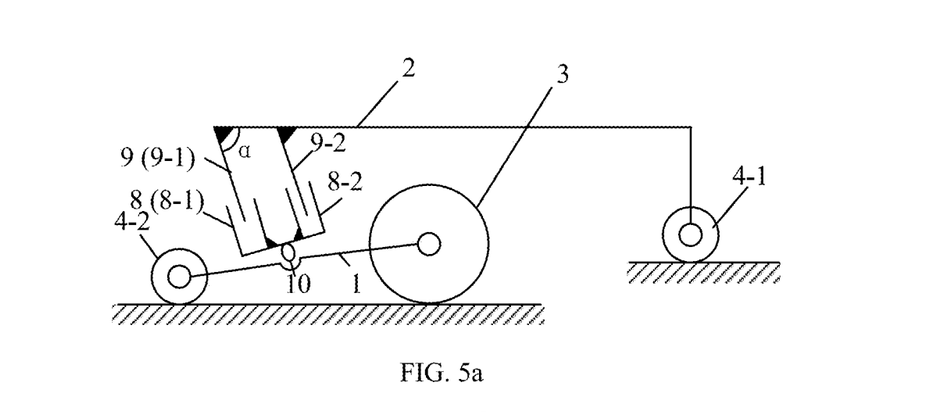
FIGS. 5a-5j are schematic diagrams illustrating an adjusting mechanism for adjusting driven wheels when being on an uneven ground according to another embodiment of the present application.

In one embodiment, as shown in FIG. 5a, the first end of the adjusting mechanism 5 is provided with a rotating ball head 10, and the adjusting mechanism 5 is hinged to the chassis 1 through the rotating ball head 10. For example, the rotating ball head 10 may include a housing for fixing to the chassis 1, and a rotatable ball head 10 disposed in the housing, and one end of the ball head 10 is connected to the carrying plate 2, for example, through a sleeve shaft. This end of the ball head 10 may be fixedly connected to one end of the sleeve shaft and the other end of the sleeve shaft is fixedly connected to the carrying plate 2. Since the ball head 10 can freely rotate 360 degrees in the housing, the carrying plate 2 can freely rotate relative to the chassis 1 through the sleeve shaft connected to the ball head 10, thereby achieving the dynamic adjustment of the second driven wheel 4-2.

Figure 5B:
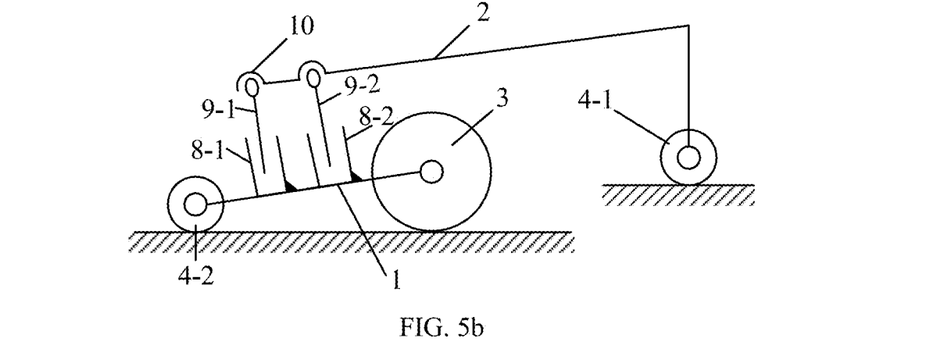
Figure 5C:
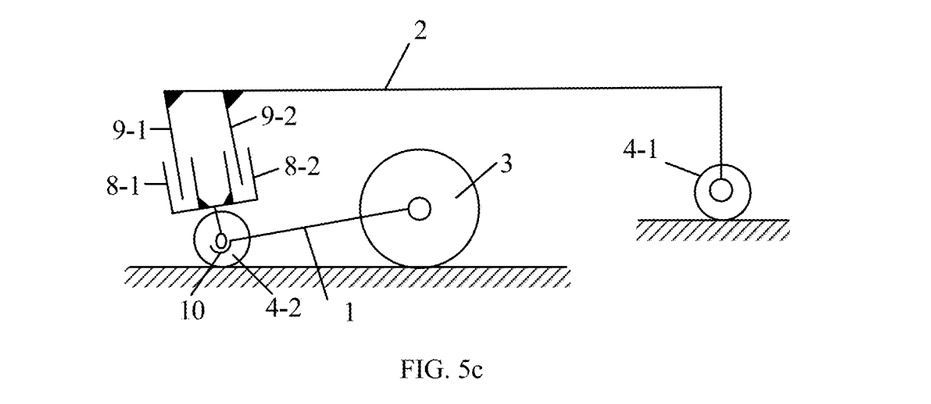
Figure 5D:
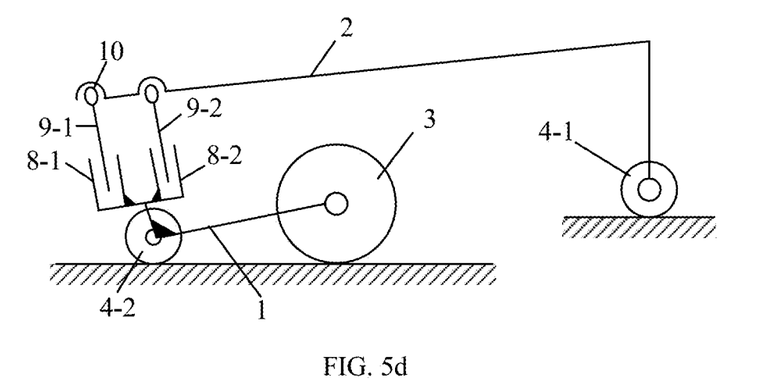

Of course, as shown in FIG. 5b, the adjusting mechanism 5 can further be connected to the carrying plate 2 through the rotating ball head 10, where the housing of the rotating ball head 10 is fixed on the carrying plate 2, one end of the ball head 10 in the housing is fixedly connected to one end of the sleeve shaft, and the other end of the sleeve shaft is fixedly connected to the chassis 1.

In one embodiment, the adjusting mechanism 5 includes at least one telescopic member, and the telescopic member includes a shaft barrel 8 and a rotating shaft 9 disposed in the shaft barrel 8. The rotating shaft 9 is telescopically disposed in the shaft barrel 8. The function of the telescopic member is to adjust the distance between the second driven wheel 4-2 and the chassis 1 by the extension and retraction of its length in accordance with the force applied to the second driven wheel 4-2. For example, one end of the shaft barrel 8 is hinged to the chassis 1, and the rotating shaft 9 disposed in the shaft barrel 8 is connected to the carrying plate 2. For example, the rotating shaft 9 has a preset telescopic length in the shaft barrel 8. That is, when the ground is flat, forces applied to the four wheels are in a certain range. At this point, the extended or retracted length of the rotating shaft 9 in the shaft barrel 8 is also in a certain range, thereby ensuring that the four wheels are always in contact with the ground. When the four wheels are on an uneven ground, forces applied to the four wheels change, and the length of the rotating shaft 9 changes when the rotating shaft 9 senses the changes of the forces through the carrying plate 2. For example, when the force applied to the second driven wheel 4-2 is increased, the extended length of the rotating shaft 9 is naturally reduced, so that the force applied to the wheels is naturally reduced, thereby offsetting the negative influence of the unevenness of the ground. Similarly, when the force applied to the second driven wheel 4-2 is reduced, that is, when the second driven wheel 4-2 has a trend to loss contact with the ground, the rotating shaft 9 naturally extends, thereby causing the driven wheel to be in contact with the ground.

In the present embodiment, for example, a preset position and changes in telescopic length of the rotating shaft 9 can be implemented through a built-in spring.

Figure 5E:
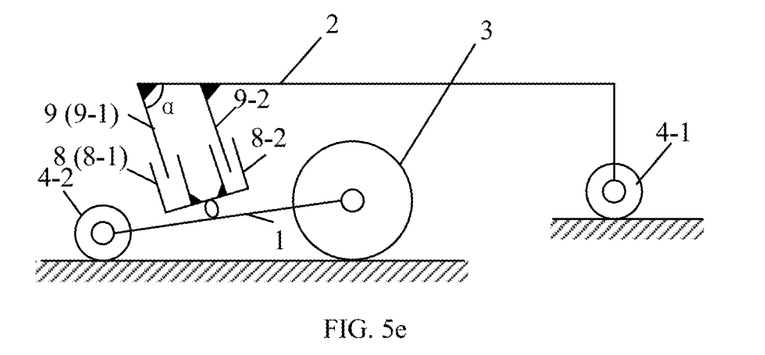
Figure 5F:
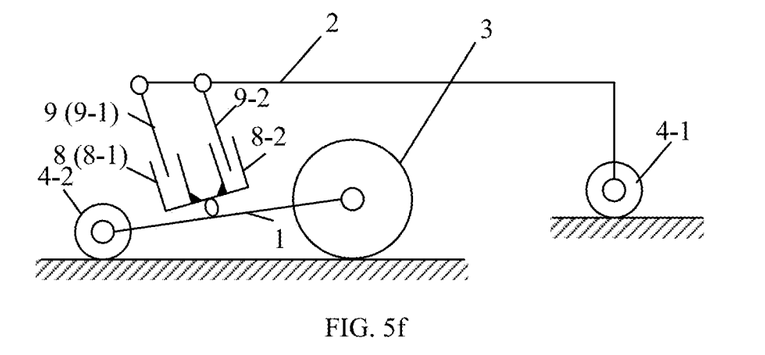
Figure 5G:
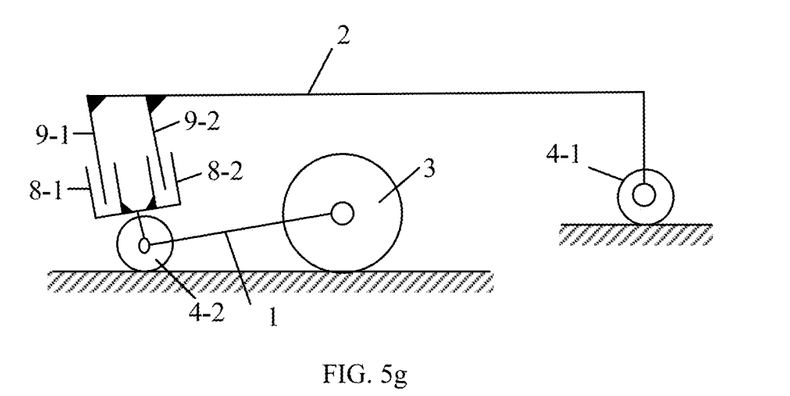
Figure 5H:
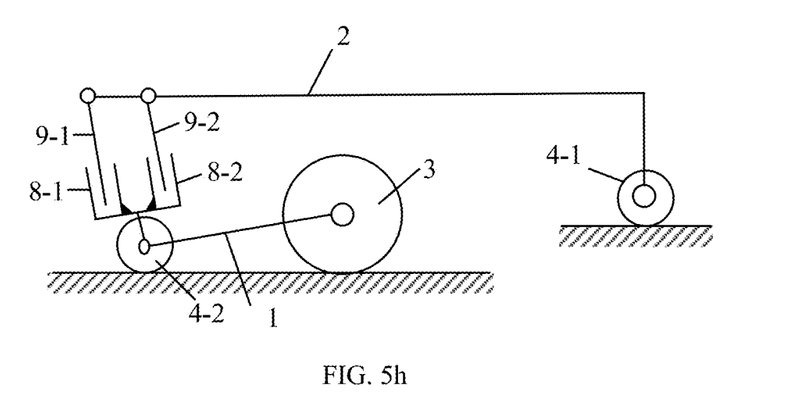
Figure 5I:
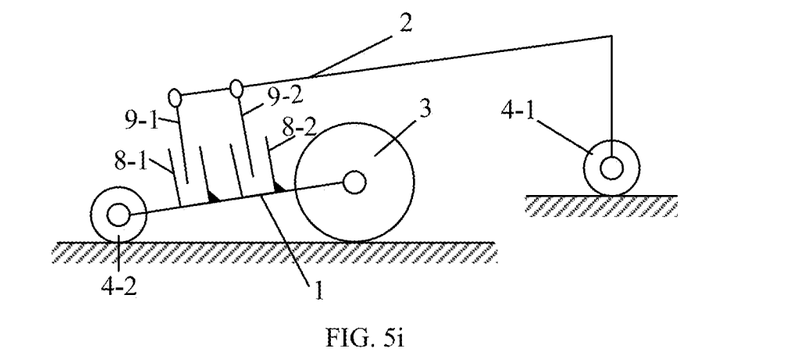
Figure 5J:
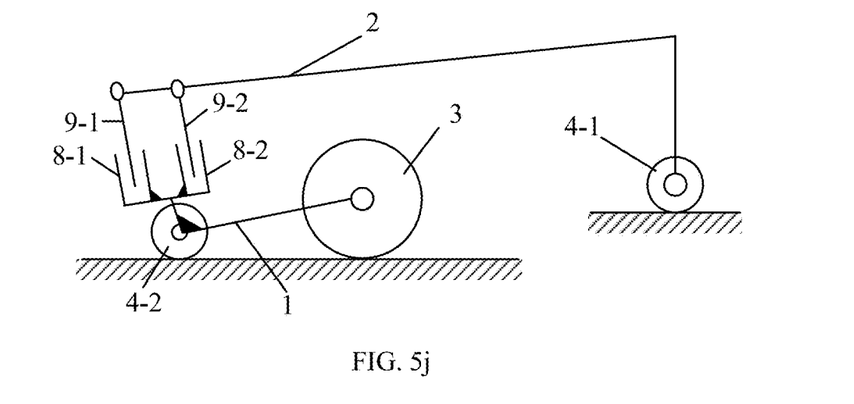
Figure 6:
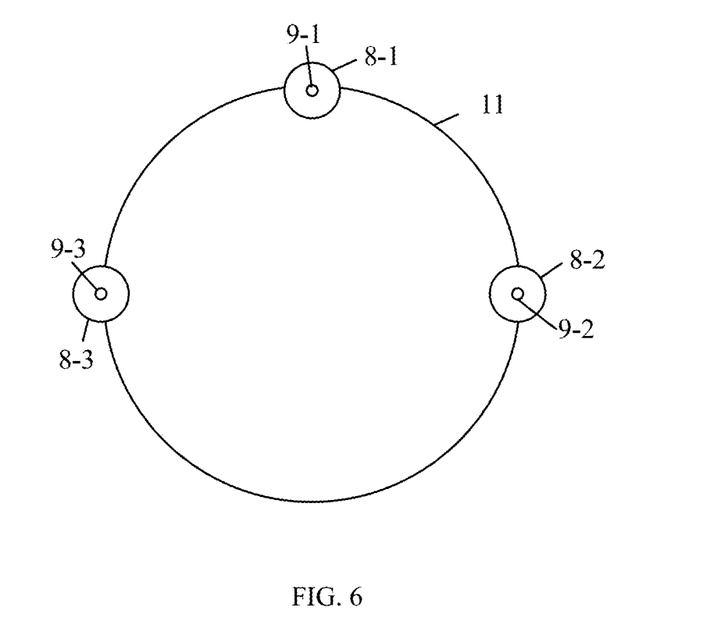
FIG. 6 is a schematic diagram illustrating telescopic members in annular arrangement according to an embodiment of the present application.

In one embodiment, as shown in FIGS. 5a-5j, the adjusting mechanism 5 includes multiple telescopic members, and the multiple telescopic members are evenly disposed between the carrying plate 2 and the chassis 1. For example, each telescopic member may be implemented in the above structure including the shaft barrel 8 and the rotating shaft 9. As shown in FIGS. 5e and 5f and 6, ends of these shaft barrels 8 (8-1, 8-2 and 8-3) are connected to the chassis 1, for example, in a hinge manner, and the rotating shafts 9 (9-1, 9-2 and 9-3) are fixedly connected or hinged to the carrying plate 2. For example, as shown in FIG. 6, the multiple telescopic members are configured in annular arrangements respectively on the plane where the chassis 1 is located and the plane where the carrying plate 2 is located, where the two planes are opposite to each other. For example, these telescopic members each include a first type connection end connected to the carrying plate 2, and these telescopic members each include a second type connection end connected to the chassis 1. A circular structure, a quadrangle, an octagon or other symmetrical geometric patterns may be obtained by connecting the first type connection points. Similarly, a circular structure, a quadrangle, an octagon or other symmetrical geometric patterns may be obtained by connecting the second type connection points. For example, the geometric pattern may be multiple rings, multiple quadrilaterals, multiple octagons, and the like. By configuring the connection manner of the telescopic members on the carrying plate 2 and the chassis 1, the adjustment stability of the adjusting mechanism 5 can be improved, and the adjustment effect on driven wheels can be improved.

In one embodiment, ends, closer to the chassis 1, of the multiple telescopic members are fixed to each other, and the other ends of the multiple telescopic members extend away from each other and are connected to the carrying plate 2. For example, as shown in FIGS. 5a, 5e and 5f and 6, ends of the multiple telescopic members can be fixed through an annular hoop member 11, and the annular hoop member 11 is hinged to the chassis 1 or connected to the chassis 1 through the above-mentioned rotating ball head 10. The other ends of the multiple telescopic members extends outwardly and divergently, and are connected to a surface, closer to the chassis, of the carrying plate 2 with a certain angle α. For example, in order to make the structure composed of the adjusting mechanism 5, the chassis 1 and the carrying plate 2 more stable, the angle α can be in a range of 15°-45°. The attitude of the driven wheels can be better adjusted by configuring the connection method and angle of the multiple telescopic members.

In the above-mentioned embodiment, for example, as shown in FIG. 6, the number of the multiple telescopic members is 3-8. As described above, the attitude adjustment of the driven wheels is implemented by evenly arranging the multiple telescopic members between the carrying plate 2 and the chassis 1 or through a method that ends of the multiple telescopic members are brought together and the other ends of the multiple telescopic members are dispersed.

In one embodiment, the adjusting mechanism 5 includes a linkage mechanism. When the road is uneven, forces applied to the driven wheels and the driving wheels change, so that the linkage mechanism conducts adaptive adjustment combined with, for example, the hinge manner, to adapt to the forces applied to the wheels, such that the wheels are ensured to be in contact with the ground.

In one embodiment, the adjusting mechanism is disposed between the carrying plate 2 and the second driven wheel 4-2. For example, the adjusting mechanism is a telescopic member or a linkage mechanism. For example, as described above, as shown in FIGS. 5c, 5d 5g, 5h, and 5j, one end or two ends of the adjusting mechanism may be movably connected to the carrying plate 2 or the second driven wheel 4-2, for example, be hinged or connected through the rotating ball head 10 to the carrying plate 2 or the second driven wheel 4-2 as described above. The flexibility of the second driven wheel 4-2 can be further adjusted with a telescopic member or a linkage mechanism between the second driven wheel 4-2 and the carrying plate 2, so that when the ground is uneven, changes in forces applied to the driven wheels can be sensed and adjusted more quickly, thereby enable the driving wheels and the driven wheels be in better contact with the ground.

As can be seen from the above exemplary configurations of the flexible base, when the ground is uneven, the flexible base can be adaptively adjusted through the adjusting mechanism which can move relative to the chassis, the driven wheels and the bearing wheels. In one embodiment, the adjusting mechanism may further include other components that can further move relative to the relative movement of the adjusting mechanism, thereby providing the flexible base with better flexibility, so that all wheels can be adaptively adjusted to better adapt to the ground.

It should be noted that merely several exemplary structures of the flexible base capable of adaptively adjustment are shown above. The simple variants of the above exemplary structures conceived by those skilled in the art can also achieve the above effects, and the corresponding technical solutions are also within the scope of the embodiments of the present application. For the sake of brevity, no further detailed description will be made herein.

Exemplarily, the flexible base according to embodiments of the present application may include at least two driving wheels and at least two driven wheels. For ease of description, the flexible base having two driving wheels and two driven wheels is described below as an example.

In one embodiment, for example, a first centerline is perpendicular to a front-and-rear direction of the chassis and divides equally the chassis into two parts: a front and a rear portion, and the two driving wheels are disposed at a left portion and a right portion of the chassis and are symmetrical about the first centerline. The moving stability can be improved by symmetrically disposing the two driving wheels.

In addition, a second centerline is parallel to the front-and-rear direction of the chassis and divides equally the chassis into the left portion and the right portion, and the two driven wheels are disposed at the left portion and the right portion of the chassis and are symmetrical about the second centerline. The chassis can be prevented from rolling over due to the uneven forces when turning with the above configuration in which the two driving wheels are symmetrically disposed about the centerline. For example, the at least two driven wheels may be symmetrically disposed relative to the second centerline, so that the two driving wheels and the two driven wheels are symmetrically disposed relative to the second centerline, and the wheel raising problem caused by the uneven ground can be better alleviated in cooperation with the adjusting mechanism of the present application.

Figure 3A:
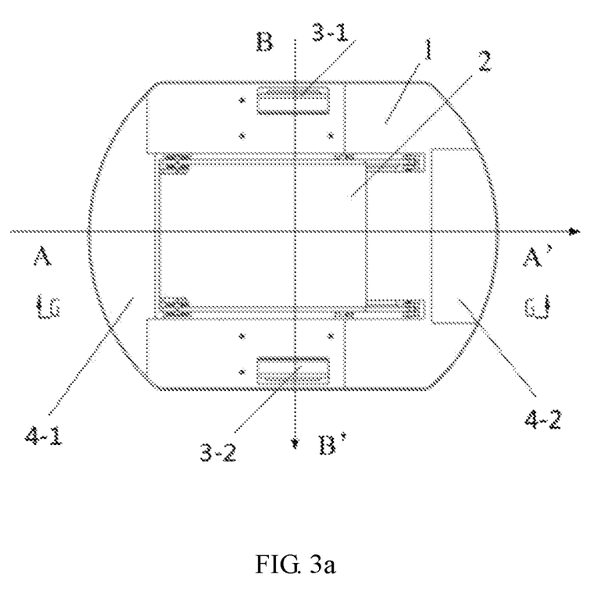
FIG. 3a and FIG. 3b are plan views of a flexible base having two driving wheels and two driven wheels according to an embodiment of the present application.

FIG. 3a shows a plan view of the flexible base, mainly for illustrating the arrangement of the wheels. For the sake of simplicity, positions of the driving wheels are marked. As shown in FIG. 3a, a direction indicated by the arrow line AA' is the front-rear direction, a direction indicated by the arrow line BB' is the left-right direction. The line AA' is the second centerline and parallel to the front-rear direction of the chassis, which divides the flexible base into the left and the right portion, and the BB' line is the first centerline and perpendicular to the front-and-rear direction of the chassis, which divides the flexible base into the front and the rear portion. At least two driving wheels 3 may be symmetrically disposed on the left portion and the right portion of the chassis relative to the second centerline AA'.

Optionally, the at least two driving wheels 3 may be asymmetrically disposed on the left portion and the right portion of the chassis relative to the second centerline AA'. For example, one driving wheel 3-1 is closer to the second centerline AA', and the other driving wheel 3-2 is relatively farther from the second centerline AA'. Or, one driving wheel 3-1 is relatively closer to the front portion of the flexible base, and the other driving wheel 3-2 is relatively closer to the rear portion of the flexible base. The embodiments of the present application do not limit this, as long as the device or apparatus including the flexible base can implement a predetermined function, for example, the self-driven robot including the flexible base can walk and carry goods normally.

In one embodiment, the at least two driving wheels 3 may be symmetrically disposed on the left portion and the right portion of the chassis 1 and on the first centerline BB'. FIG. 3a shows such a structure. In one embodiment, the at least two driving wheels 3 may be asymmetrically disposed on the left portion and the right portion of the chassis 1 and on the first centerline BB'.

It should be noted that words "wheels on the first centerline BB'" described above refers to that wheel axels are on the first centerline, and the symmetric or asymmetric arrangement also refers to that the wheel axels are symmetrically or asymmetrically disposed.

Exemplarily, for the flexible base according to the embodiments of the present application, the two driven wheels 4-1 and 4-2 may be symmetrically disposed on the left portion and the right portion of the chassis 1 relative to the second centerline AA'. Optionally, at least, the two driving wheels are asymmetrically disposed on the left portion and the right portion of the chassis relative to the second centerline AA'. For example, one driven wheel 4-1 is closer to the second centerline, while the other driven wheel 4-2 is farther from the second centerline. Or, one driven wheel 4-1 is relatively closer to the front portion of the flexible base, and the other driven wheel 4-2 is relatively closer to the rear portion of the flexible base, which is not limited by the embodiments of the present application.

Figure 3B:
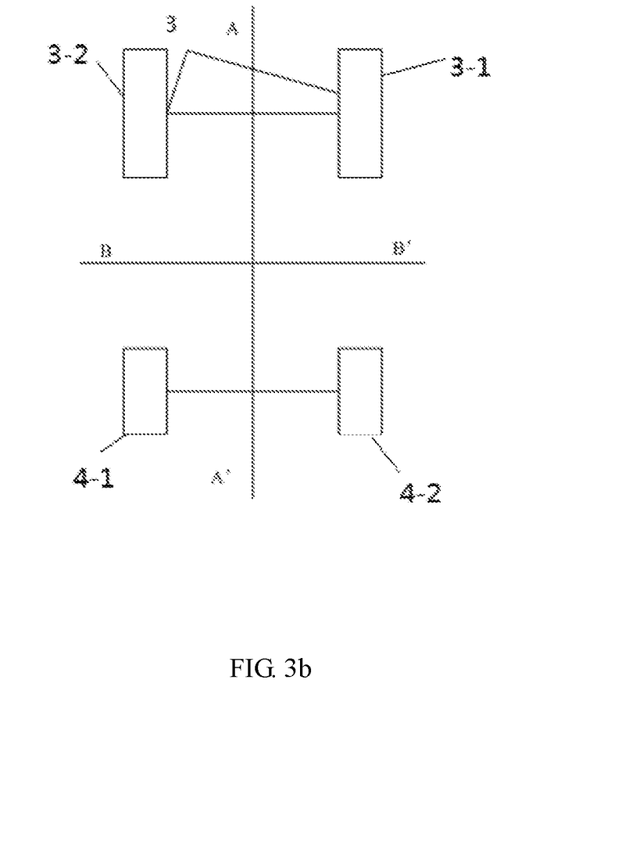

In addition, for the positional relationship between the driving wheels and the driven wheels, as long as the configuration of the driving wheels and the driven wheels enables the flexible base to work normally, the embodiments of the present application does not limit the positional relationship. For example, as shown in FIG. 3b, the driving wheels are symmetrically disposed on the left portion and the right portion of the flexible base relative to the second centerline, and the driven wheels are also symmetrically disposed on the left portion and the right portion of the flexible base relative to the second centerline, but the driven wheels are located on the rear portion, and the driving wheels are located on the front portion.

Exemplarily, the two driven wheels 4-1 and 4-2 are symmetrically disposed on the front portion and the rear portion of the chassis 1 relative to the first centerline BB'.

Exemplarily, as shown in FIG. 3a, the two driven wheels 4-1 and 4-2 are symmetrically disposed on the front portion and the rear portion of the chassis relative to the second centerline AA'.

The above is a description of the specific arrangement of the wheels by taking two driving wheels and two driven wheels as an example, but the embodiments of the present application are not limited to two driving wheels and two driven wheels. For example, the flexible base may include five, six or even more wheels. For example, for a five-wheel solution, the five wheels may include two driving wheels and three driven wheels or three driving wheels and two driven wheels; and for a six-wheel solution, the six wheels may include two driving wheels and four driven wheels or four driving wheels and two driven wheels, etc., which is not limited by the embodiments of the present application. For various arrangement of wheels, reference may be made to the above exemplary structures, as long as the purpose of the present application can be achieved.

In one embodiment, for the flexible base according to the embodiments of the present application, one of the two driven wheels may include two first secondary driven wheels. The two first secondary driven wheels are respectively disposed on two ends of a first shaft and the midpoint of the first shaft may be on the second centerline AA'. For example, the first shaft may also be hinged to the chassis or the adjusting mechanism.

Exemplarily, each of the two driven wheels includes two secondary driven wheels. For example, one of the two driven wheels includes two first secondary driven wheels, and the other one of the two driven wheels includes two second secondary driven wheels. The two first secondary driven wheels are respectively disposed on two ends of the first shaft, and the two second secondary driven wheels are respectively disposed on two ends of a second shaft. The midpoint of the first shaft and the midpoint of the second shaft are both on the second centerline AA'. For example, the first shaft is hinged to the chassis or the adjusting mechanism, and correspondingly, the second shaft is hinged to the adjusting mechanism or the chassis.

Exemplarily, for a case where the flexible base includes two or more driven wheels, at least one of the at least two driven wheels may include two secondary driven wheels, which may be disposed on one shaft. The shaft may be hinged to the chassis or the adjusting mechanism.

For the flexible base according to the embodiments of the present application, the adjusting mechanism of the flexible base is hinged to the carrying plate and the chassis. When the ground surface is uneven, the carrying plate, the driven wheels and the chassis move relative to the adjusting mechanism and are dynamically adjusted by the adjusting mechanism, so that the flexible base can be automatically adapted to the ground and the at least two driven wheels and the at least two driving wheels are always in contact with the ground.

Another aspect of the present application provides a self-driven robot including the above-mentioned flexible base.

Figure 4:
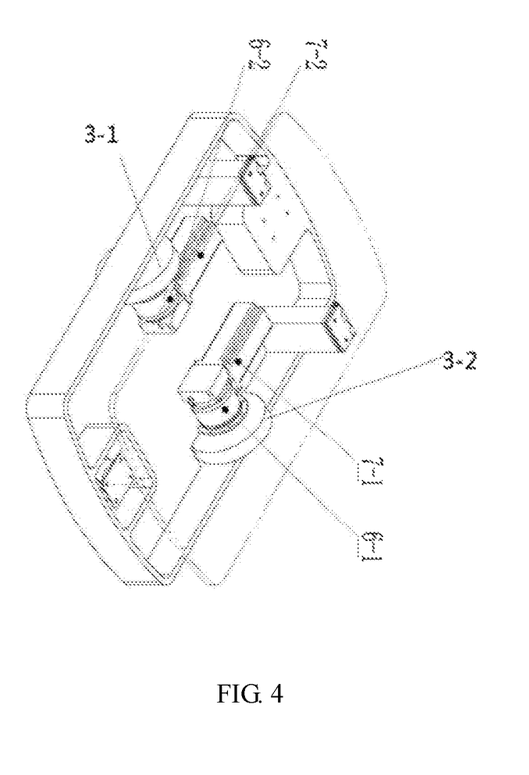
FIG. 4 is a partial structural diagram of a self-driven robot according to an embodiment of the present application.

With reference to FIG. 4, the self-driven robot of an embodiment of the present application includes: a flexible base as described above; at least two drive motors 7-1 and 7-2 which are disposed above the flexible base and respectively connected to at least two driving wheels 3-1 and 3-2 so as to drive driven wheels which are connected to the driving wheels; and a lifting mechanism disposed above the flexible base. Two speed reducers 6-1 and 6-2 are respectively connected to the drive motors 7-1 and 7-2.

Exemplarily, for a transport robot according to the embodiment of the present application, the lifting mechanism is provided with an opening at its central portion. The opening is provided with a camera capable of shooting upwardly and downwardly for scanning the two-dimensional code of the goods and the two-dimensional code of the ground.

The self-driven robot according to the embodiment of the present application includes the flexible base. If the ground surface is uneven or the wheels are not mounted at a exactly same height, the adjusting mechanism provided between the carrying plate and the chassis can move relative to the carrying plate and the chassis, so that the heights of the wheels mounted on the base can be automatically adapted to the ground and all wheels can be in contact with the ground, thereby avoiding the risk that the goods fall over because the wheels lose contact with the ground, avoiding the problem that the robot is out of control because the driving wheels lose contact with the ground and achieving the even distribution of the goods.

What is claimed is:

1. A flexible base, which is applied to a self-driven robot, comprising:
   a chassis, wherein a bottom of the chassis is provided with at least one second driven wheel and at least two driving wheels, and a disposing position of the second driven wheel does not coincide with disposing positions of the driving wheels;
   a carrying plate, wherein a bottom of the carrying plate is provided with at least a first driven wheel, and a disposing position of the first driven wheel does not coincide with disposing positions of the second driven wheel and the driving wheels; and
   an adjusting mechanism, wherein the adjusting mechanism is configured to be connected to the carrying plate and the chassis or configured to be connected to the carrying plate and the second driven wheel, and when the ground is uneven, the adjusting mechanism is configured to dynamically adjust the second driven wheel in such a manner that the first driven wheel, the second driven wheel and the driving wheels are in contact with the ground,
   wherein the adjusting mechanism comprises a plurality of telescopic members, the plurality of telescopic members are evenly disposed between the carrying plate and the chassis or between the carrying plate and the second driven wheel, each of the plurality of telescopic members comprises a shaft barrel and a rotating shaft disposed in the shaft barrel, the rotating shaft is telescopically disposed in the shaft barrel, and the plurality of telescopic members are configured in annular arrangements respectively on a surface of the chassis and a surface of the carrying plate, and the surface of the chassis and the surface of the carrying plate face each other.

2. The flexible base according to claim 1, wherein a first end of the adjusting mechanism is hinged to the chassis or the second driven wheel, and a second end of the adjusting mechanism is connected to the carrying plate.

3. The flexible base according to claim 2, wherein the second end of the adjusting mechanism is fixedly connected or hinged to the carrying plate.

4. The flexible base according to claim 1, wherein a first end of the adjusting mechanism is fixedly connected to the chassis or the second driven wheel, and a second end of the adjusting mechanism is hinged to the carrying plate.

5. The flexible base according to claim 2, wherein the first end of the adjusting mechanism is provided with a rotating ball head, and the adjusting mechanism is hinged to the chassis or the second driven wheel through the rotating ball head.

6. The flexible base according to claim 4, wherein the second end of the adjusting mechanism is provided with a rotating ball head, and the adjusting mechanism is hinged to the carrying plate through the rotating ball head.

7. The flexible base according to claim 1, wherein the shaft barrel is hinged to the chassis or the second driven wheel, and the rotating shaft is connected to the carrying plate.

8. The flexible base according to claim 1, wherein each of the plurality of telescopic members has a first end and a second end, wherein the second end is closer to the chassis or the second driven wheel than the first end, the first ends of the plurality of telescopic members are fixed to each other, and the second ends of the plurality of telescopic members extend in directions in a manner that the second ends of the plurality of telescopic members are spaced apart from each other, and the second ends of the plurality of telescopic members are connected to the carrying plate.

9. The flexible base according to claim 1, wherein an included angle between the telescopic member and the carrying plate is in a range of 15°-45°.

10. The flexible base according to claim 1, wherein the number of the telescopic members is 3-8.

11. The flexible base according to claim 7, wherein the second driven wheel is connected to the carrying plate through the telescopic member or the linkage mechanism; or the chassis is connected to the carrying plate through the telescopic member or the linkage mechanism.

12. The flexible base according to claim 1, wherein the at least two driving wheels are disposed at a left and a right portion of the chassis and are symmetrical relative to a first centerline, and the first centerline is perpendicular to a front-and-rear direction of the chassis and equally divides the chassis into a front portion and a rear portion.

13. The flexible base according to claim 1, wherein the at least two driving wheels are disposed at a left and a right portion of the chassis and are symmetrical relative to a second centerline, and the second centerline is parallel to a front-and-rear direction of the chassis and equally divides the chassis into the left and the right portion.

14. The flexible base according to claim 13, wherein the at least two driven wheels are symmetrically disposed relative to the second centerline.

15. The flexible base according to claim 12, wherein the at least two driven wheels are symmetrically disposed relative to the first centerline.

16. A self-driven robot, comprising a flexible base, at least two drive motors, and a lifting mechanism,
   wherein the flexible base comprises:
   a chassis, wherein a bottom of the chassis is provided with at least one second driven wheel and at least two driving wheels, and a disposing position of the second driven wheel does not coincide with disposing positions of the driving wheels;
   a carrying plate, wherein a bottom of the carrying plate is provided with at least a first driven wheel, and a disposing position of the first driven wheel does not coincide with disposing positions of the second driven wheel and the driving wheels; and
   an adjusting mechanism, wherein the adjusting mechanism is configured to be connected to the carrying plate and the chassis or configured to be connected to the carrying plate and the second driven wheel, and when the ground is uneven, the adjusting mechanism is configured to dynamically adjust the second driven wheel in such a manner that the first driven wheel, the second driven wheel and the driving wheels are in contact with the ground, wherein the at least two drive motors are disposed above the flexible base and respectively connected to at least two driving wheel, wherein the adjusting mechanism comprises a plurality of telescopic members, the plurality of telescopic members are evenly disposed between the carrying plate and the chassis or between the carrying plate and the second driven wheel, each of the plurality of telescopic members comprises a shaft barrel and a rotating shaft disposed in the shaft barrel, the rotating shaft is telescopically disposed in the shaft barrel, and the plurality of telescopic members are configured in annular arrangements respectively on a surface of the chassis and a surface of the carrying plate, and the surface of the chassis and the surface of the carrying plate face each other.

17. The self-driven robot according to claim 16, further comprising two speed reducers, wherein the two speed reducers are respectively connected to the drive motors.

18. The self-driven robot according to claim 16, wherein the lifting mechanism is provided with an opening and a camera disposed at the opening, wherein the camera is configured to scan a two-dimensional code.

\* \* \* \* \*